(12) United States Patent
Suzuki

(10) Patent No.: US 7,583,069 B2
(45) Date of Patent: Sep. 1, 2009

(54) BOOSTER

(75) Inventor: Hiroshi Suzuki, Okazaki (JP)

(73) Assignee: JTEKT Corporation, Osaka-shi (JP)

( * ) Notice: Subject to any disclaimer, the term of this patent is extended or adjusted under 35 U.S.C. 154(b) by 253 days.

(21) Appl. No.: 11/209,651

(22) Filed: Aug. 24, 2005

(65) Prior Publication Data

US 2006/0044852 A1    Mar. 2, 2006

(30) Foreign Application Priority Data

Aug. 26, 2004    (JP)    ............................ 2004-247154

(51) Int. Cl.
*G05F 1/00* (2006.01)
*B62D 5/04* (2006.01)

(52) U.S. Cl. .................. 323/285; 180/444; 180/446

(58) Field of Classification Search ................. 323/222, 323/282–288; 363/21.12–21.18, 89, 97, 363/98; 318/430, 434, 504; 701/43, 41; 180/446, 444

See application file for complete search history.

(56) References Cited

U.S. PATENT DOCUMENTS

| | | | |
|---|---|---|---|
| 4,630,187 A | | 12/1986 | Henze |
| 5,065,078 A | * | 11/1991 | Nao et al. ...................... 318/16 |
| 5,202,830 A | * | 4/1993 | Tsurumiya et al. ............. 701/41 |
| 5,233,508 A | * | 8/1993 | Yamamura et al. ............. 363/49 |
| 5,264,780 A | * | 11/1993 | Bruer et al. ................... 323/222 |
| 5,367,247 A | * | 11/1994 | Blocher et al. ................ 323/222 |
| 5,521,820 A | * | 5/1996 | Wakamatsu et al. ........... 701/42 |
| 6,100,677 A | * | 8/2000 | Farrenkopf ................... 323/285 |
| 6,198,258 B1 | | 3/2001 | Ando et al. |
| 6,316,926 B1 | * | 11/2001 | Savo et al. .................... 323/282 |
| 6,502,024 B2 | * | 12/2002 | Ishihara et al. ................. 701/41 |
| 6,515,880 B1 | | 2/2003 | Evans et al. |
| 6,694,272 B1 | | 2/2004 | Zvonar |
| 6,727,669 B2 | * | 4/2004 | Suzuki et al. ................ 318/139 |
| 6,845,309 B2 | * | 1/2005 | Recker et al. .................. 701/41 |
| 6,885,225 B2 | * | 4/2005 | Ohmichi et al. .............. 327/112 |
| 6,973,992 B2 | * | 12/2005 | Yoneda et al. ............... 180/446 |
| 7,257,475 B2 | * | 8/2007 | Asaumi et al. ................. 701/43 |
| 2004/0085052 A1 | | 5/2004 | Itabashi et al. |
| 2004/0113597 A1 | * | 6/2004 | Miyazaki ..................... 323/282 |

FOREIGN PATENT DOCUMENTS

| | | |
|---|---|---|
| DE | 43 08 503 A1 | 9/1994 |
| EP | 0 532 263 A1 | 3/1993 |
| EP | 0 582 814 A2 | 2/1994 |
| JP | 2003-319700 | 11/2003 |

* cited by examiner

*Primary Examiner*—Jessica Han
*Assistant Examiner*—Emily Pham
(74) *Attorney, Agent, or Firm*—Oblon, Spivak, McClelland, Maier & Neustadt, P.C.

(57) ABSTRACT

A booster includes a booster circuit and a microcomputer. The booster circuit outputs an output voltage. The output voltage is obtained by boosting a power supply voltage. The microcomputer controls the output voltage through a feedback control based on the deviation of the output voltage from a target voltage. The microcomputer determines whether the booster is in an initial state based on a start signal or a restart signal. When determining that the booster is in the initial state, the microcomputer corrects the target voltage such that the target voltage gradually increases from the power supply voltage as time elapses until a predetermined period elapses from the start of the initial state.

6 Claims, 12 Drawing Sheets

_US 7,583,069 B2_

BOOSTER

CROSS-REFERENCE TO RELATED APPLICATIONS

This application is based upon and claims the benefit of priority from prior Japanese Patent Application No. 2004-247154, filed on Aug. 26, 2004, the entire contents of which are incorporated herein by reference.

BACKGROUND OF THE INVENTION

The present invention relates to a booster that outputs an output voltage obtained by boosting a power supply voltage.

In recent years, electric power steering (EPS) apparatuses, which use a motor as a driving source, are widely used as vehicle power steering apparatuses. Some of EPS apparatuses include a booster circuit to boost a supply source voltage. Such an EPS apparatus controls a motor based on a boosted voltage.

For example, Japanese Laid-Open Patent Publication No. 2003-319700 discloses an EPS apparatus that includes a booster circuit provided between a vehicle power supply and a drive circuit, and a controller for controlling the booster circuit. The voltage boosted by the booster is applied to the drive circuit, so that assisting force increases and the rise characteristic of the assisting force is improved.

In the above described conventional EPS apparatus, the controller controls output voltage through feedback control based on the deviation of the output voltage from a target voltage, thereby stabilizing the output voltage irrespective of fluctuations of the power supply voltage.

However, in an initial state of the booster, for example, when the engine is started (ignition switch is turned on) or when the power steering apparatus is reset after malfunction diagnosis, the output voltage of the booster circuit is as low as a level substantially equal to the power supply voltage. Thus, the deviation of the output voltage from the target voltage is significantly large. As a result, the output voltage rises abruptly, which can cause the output voltage to overshoot the target voltage.

Accordingly, the smoothing capacitor of the booster circuit needs to be replaced by a larger one so that the booster circuit can resist an excessively boosted voltage during overshooting, or the responsivity of the booster control needs to be lowered so that overshooting does not occur. In either case, the manufacturing costs increase and the output voltage becomes unstable.

SUMMARY OF THE INVENTION

Accordingly, it is an objective of the present invention to provide a booster that effectively prevents overshooting of an output voltage at an initial state without increasing the manufacturing costs and making the output voltage unstable.

To achieve the forgoing and other objectives and in accordance with the purpose of the present invention, a booster including a booster circuit and a control section is provided. The booster circuit outputs an output voltage. The output voltage is obtained by boosting a power supply voltage. The control section controls the output voltage of the booster circuit through a feedback control based on a deviation of the output voltage from a target voltage. The control section includes an initial state determination section that determines whether the booster is in an initial state based on a start signal or a restart signal. When the initial state determination section determines that the booster is in the initial state, the control section corrects the target voltage such that the target voltage gradually increases from the power supply voltage as time elapses until a predetermined period elapses from the start of the initial state.

The present invention also provides a booster including a booster circuit and a control section. The booster circuit outputs an output voltage. The output voltage is obtained by boosting a power supply voltage. The control section controls the output voltage of the booster circuit by sending a control signal to the booster circuit. The control signal contains a duty ratio that is determined through a feedback control computation based on a deviation of the output voltage from a target voltage. The control section includes an initial state determination section, an upper limit determination section, and a duty ratio limitation section. The initial state determination section determines whether the booster is in an initial state based on a start signal or a restart signal. The upper limit determination section determines an upper limit of the duty ratio. The duty ratio limitation section limits the duty ratio of the control signal to a value equal to or less than the upper limit value. When the initial state determination section determines that the booster is in the initial state, the upper limit determination section corrects the upper limit of the duty ratio such that the upper limit of the duty ratio gradually increases as time elapses until a predetermined period elapses from the start of the initial state.

Another booster including a booster circuit and a control section is provided. The booster circuit outputs an output voltage. The output voltage is obtained by boosting a power supply voltage. The control section controls the output voltage of the booster circuit through a feedback control based on a deviation of the output voltage from a target voltage. The control section includes a feedback gain determination section that determines a feedback gain of the feedback control based on the deviation. The feedback gain determination section determines the feedback gain such that the feedback gain has a value of a low responsivity. The responsivity increases as the deviation of the output voltage from the target voltage decreases.

The present invention provides another booster including a booster circuit and a control section. The booster circuit outputs an output voltage. The output voltage is obtained by boosting a power supply voltage. The control section controls the output voltage of the booster circuit through a feedback control based on a deviation of the output voltage from a target voltage. The control section includes a feedback gain determination section that determines a feedback gain of the feedback control based on the deviation. When the deviation of the output voltage from the target voltage is greater than a predetermined value, the feedback gain determination section determines the feedback gain such that the feedback gain has a small value of a lower responsivity than the responsivity of the feedback gain in the case where the deviation of the output voltage from the target voltage is equal to or less than the predetermined value.

Another booster provided by the present invention also includes a booster circuit and a control section. The booster circuit outputs an output voltage. The output voltage is obtained by boosting a power supply voltage. The control section controls the output voltage of the booster circuit through a feedback control based on a deviation of the output voltage from a target voltage. The control section includes an initial state determination section and a feedback gain determination section. The initial state determination section determines whether the booster is in an initial state based on a start signal or a restart signal. The feedback gain determination section determines a feedback gain of the feedback control. When the initial state determination section determines that the booster is in the initial state, the feedback gain determination section determines the feedback gain such that the feedback gain has a value of a low responsivity. The responsivity increases as the elapsed time from the start of the initial state increases until a predetermined period elapses from the start of the initial state.

The present invention provides yet another booster including a booster circuit and a control section. The booster circuit outputs an output voltage. The output voltage is obtained by boosting a power supply voltage. The control section controls the output voltage of the booster circuit through a feedback control based on a deviation of the output voltage from a target voltage. The control section includes an initial state determination section that determines whether the booster is in an initial state based on a start signal or a restart signal. The control section also includes a feedback gain determination section that determines a feedback gain of the feedback control. When the initial state determination section determines that the booster is in the initial state, the feedback gain determination section determines, before a predetermined period elapses from the start of initial state, the feedback gain, such that the feedback gain has a small value of a lower responsivity than the responsivity of the feedback gain after the predetermined period has elapsed from the start of the initial state.

Other aspects and advantages of the invention will become apparent from the following description, taken in conjunction with the accompanying drawings, illustrating by way of example the principles of the invention.

DETAILED DESCRIPTION OF THE PREFERRED EMBODIMENTS

Hereafter, an electric power steering (EPS) apparatus 1 having a booster 23 according to a first embodiment of the present invention will be described with reference to the drawings.

Figure 1:
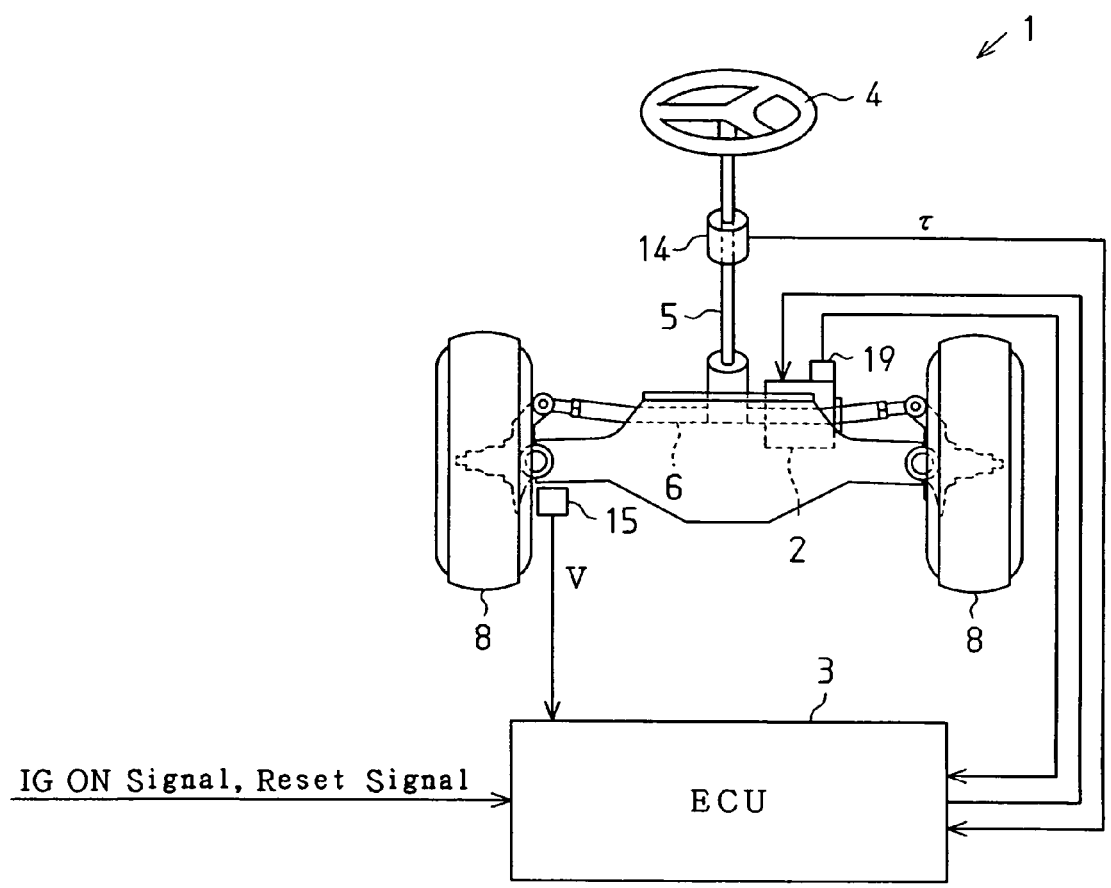
FIG. 1 is a diagrammatic view illustrating an electric power steering (EPS) apparatus according to a first embodiment of the present invention.

As shown in FIG. 1, the apparatus 1 includes a motor 2, which functions as a driving source for applying assisting force to the steering system of a vehicle, and an ECU 3 for controlling the motor 2.

A steering wheel 4 is coupled to a rack 6 with a steering shaft 5. Rotation of the steering shaft 5 caused by steering operation is converted into linear reciprocation of the rack 6 by means of a rack-and-pinion mechanism (not shown) and is transmitted to steered wheels 8. The EPS apparatus 1 of this embodiment is a rack type EPS apparatus, in which the motor 2 is arranged coaxial with the rack 6. Assisting torque generated by the motor 2 is transmitted to the rack 6 through a ball screw mechanism (not shown). The ECU 3 controls assisting force applied to the steering system by controlling the assisting torque generated by the motor 2.

Figure 2:
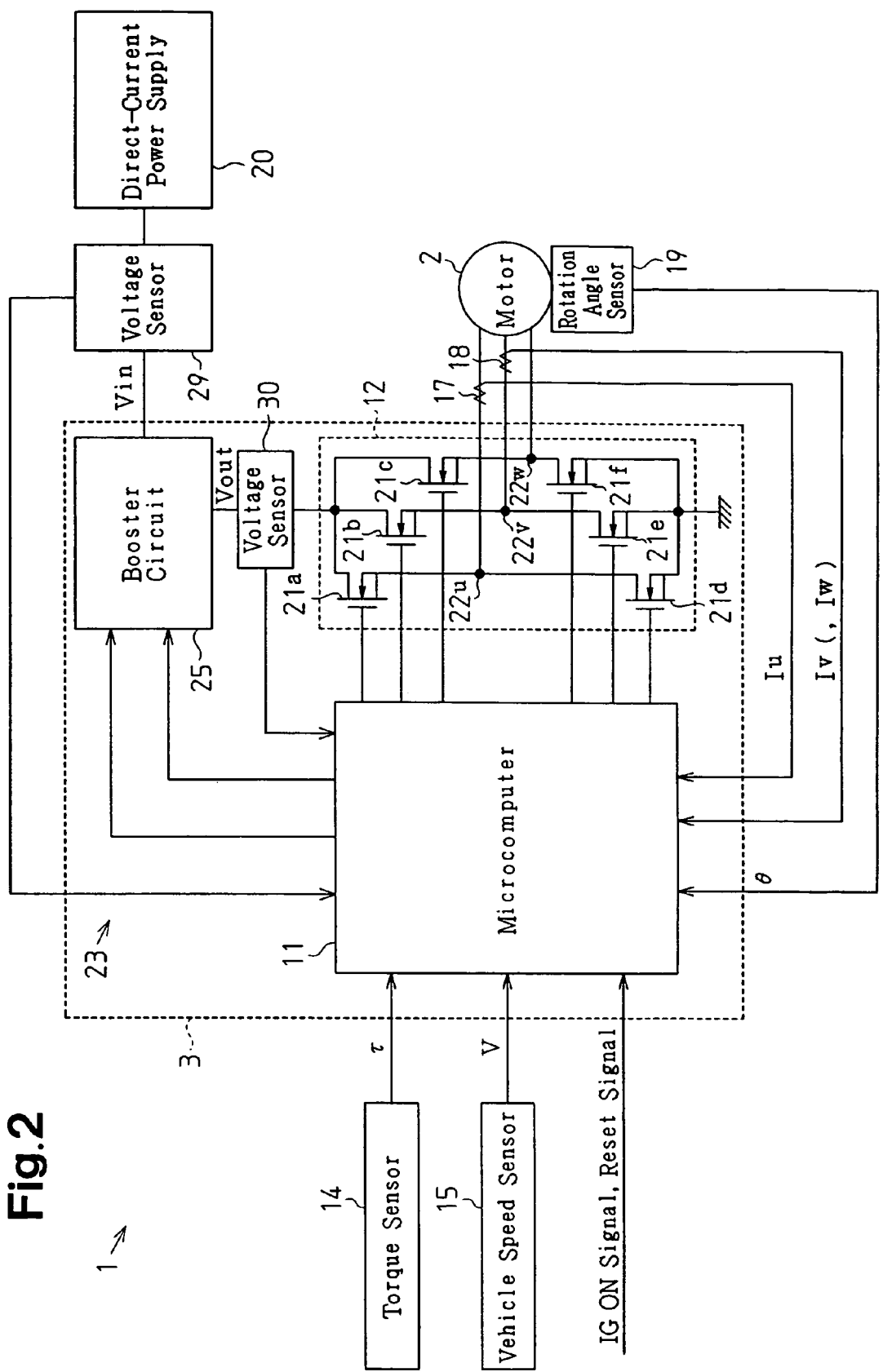
FIG. 2 is a block diagram illustrating the electrical configuration of the apparatus of FIG. 1.

As shown in FIG. 2, the ECU 3 has a microcomputer 11 that outputs a motor regulation signal, and a drive circuit 12 that supplies power to the motor 2 based on the motor regulation signal. The motor 2 of the present embodiment is a brushless motor. The drive circuit 12 supplies power of three phases (U, V, W) to the motor 2 based on the motor regulation signal.

The microcomputer 11 is connected to a torque sensor 14 for detecting steering torque $\tau$ and a vehicle speed sensor 15 (see FIG. 1). Based on the inputted steering torque $\tau$ and the vehicle speed V, the microcomputer 11 determines assisting force to be applied to the steering system, that is, assisting torque to be generated by the motor 2.

The microcomputer 11 is also connected to current sensors 17, 18 for detecting values of current supplied to the motor 2, and rotation angle sensor 19 for detecting the rotation angle (electrical angle) $\theta$ of the motor 2. Based on the output signals of these sensors, the microcomputer 11 detects phase current values Iu, Iv, Iw, and the rotation angle $\theta$ of the motor 2. Based on the detected phase current values Iu, Iv, Iw and the rotation angle $\theta$, the microcomputer 11 outputs a motor regulation signal for causing the motor 2 to generate the determined assisting torque.

In this embodiment, the microcomputer 11 subjects the phase current values Iu, Iv, Iw to d/q conversion for controlling currents on a d/q coordinate system. Specifically, the microcomputer 11 controls a q-axis current value to follow a q-axis current command value that is a target value of the assisting torque. Then, the microcomputer 11 sends the motor regulation signal, which has been determined based on the current control in the d/q coordinate system, to the drive circuit 12.

The drive circuit 12 includes power MOSFETs (hereinafter, simply referred to as FET), the number of which corresponds to the number of phases of the motor 2 (2×3). More specifically, the drive circuit 12 includes a series circuit of FETs 21a, 21d, a series circuit of FET 21b, 21e, and a series circuit FETs 21c, 21f, which are connected to one another in parallel. A node 22u of the FETs 21a, 21d is connected to a U phase coil of the motor 2, a node 22v of the FETs 21b, 21e is connected to a V phase coil of the motor 2, and a node 22w of the FETs 21c, 21f is connected to a W phase coil of the motor 2.

Motor regulation signals outputted by the microcomputer 11 are applied to the gate terminals of the FETs 21a to 21f. In response to the motor regulation signal, the FETs 21a to 21f are turned on and off so that direct-current voltage supplied by a direct-current power supply 20 is converted into power of three phases (U, V, W), which is then supplied to the motor 2.

The apparatus 1 includes the booster 23. In this embodiment, the booster 23 is configured of a booster circuit 25 and a control section, which is the microcomputer 11. The booster circuit 25 is provided in a power supplying path between the direct-current power supply 20 and the drive circuit 12. The booster circuit 25 is controlled by the microcomputer 11 and boosts power supply voltage Vin of the direct-current power supply 20 and sends the boosted voltage Vin to the drive circuit 12.

Figure 3:
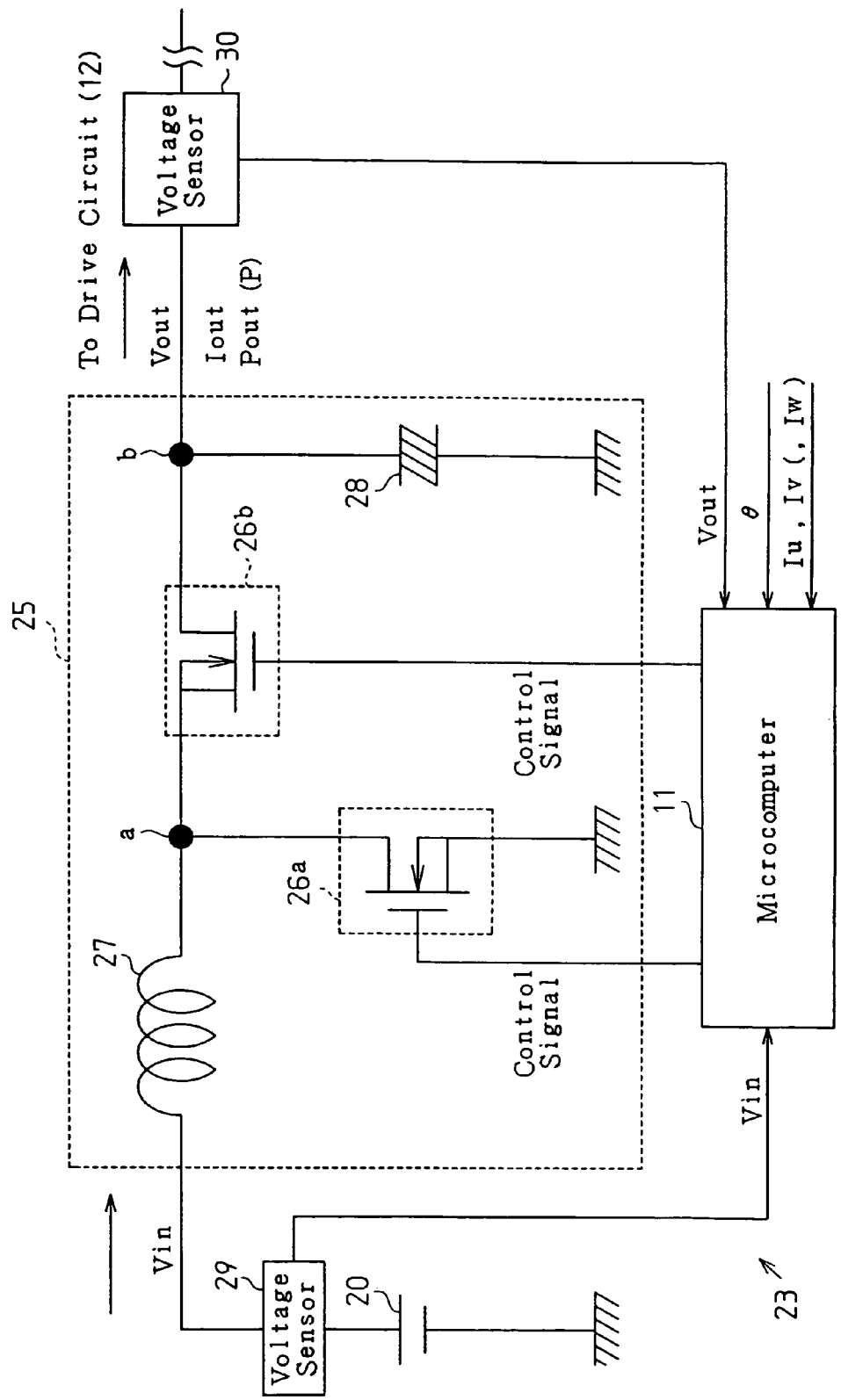
FIG. 3 is a block diagram illustrating a booster of the apparatus of FIG. 1.

As shown in FIG. 3, the booster circuit 25 includes FETs 26a, 26b, a coil 27, and a capacitor 28. One end of the coil 27 is connected to the direct-current power supply 20, and the other end is connected to a drain terminal of the FET 26a. A source terminal of the FET 26a is grounded. A node a between the coil 27 and the FET 26a is connected to a source terminal of the FET 26b. A drain terminal of the FET 26b is connected to the drive circuit 12. A node b between the FET 26b and the drive circuit 12 is grounded via the capacitor 28.

The gate terminals of FETs 26a, 26b are connected to the microcomputer 11. The microcomputer 11 applies control signals to the gate terminals of FETs 26a, 26b, thereby turning the FETs 26a, 26b on and off. Accordingly, when the FET 26a is turned off, the voltage at the node a becomes equal to a voltage obtained by superimposing the counter electromotive force generated in the coil 27 onto the power supply voltage Vin. When the FET 26a is turned on, the voltage at the node a becomes the grounded voltage. When the FET 26b is turned on, the voltage at the node a is applied to the node b. The booster circuit 25 smoothes the voltage and current that fluctuate at the node b with the capacitor 28, thereby outputting output voltage Vout, which is obtained by boosting the power supply voltage Vin of the direct-current power supply 20.

In this embodiment, the microcomputer 11 sends, as control signals, pulse signals each having a predetermined duty ratio to the FETs 26a, 26b, thereby controlling output voltage Vout of the booster circuit 25. Hereinafter, the control of the output voltage Vout is referred to as boost control.

More specifically, the microcomputer 11 is connected to a first voltage sensor 29 for detecting the power supply voltage Vin of the direct-current power supply 20 and a second voltage sensor 30 for detecting the output voltage Vout of the booster circuit 25. Based on the deviation of the output voltage Vout detected by the second voltage sensor 30 from a target voltage Vout*, which is a control target, the microcomputer 11 performs feedback control computation of the output voltage Vout. The microcomputer 11 then sends control signals having the duty ratio that has been determined in the feedback control computation to the FETs 26a, 26b. In response to the control signal, the on time and the off time of each of the FETs 26a, 26b is changed. The output voltage Vout of the booster circuit 25 is thus controlled.

The output voltage Vout of the booster circuit 25 is set to a higher value when the duty ratio of the control signal (ON duty ratio of the control signal sent to the FET 26a) is great. The output voltage Vout is set to a lower value when the duty ratio is small.

Next, the boost control in the booster according to this embodiment will now be described.

Figure 4:
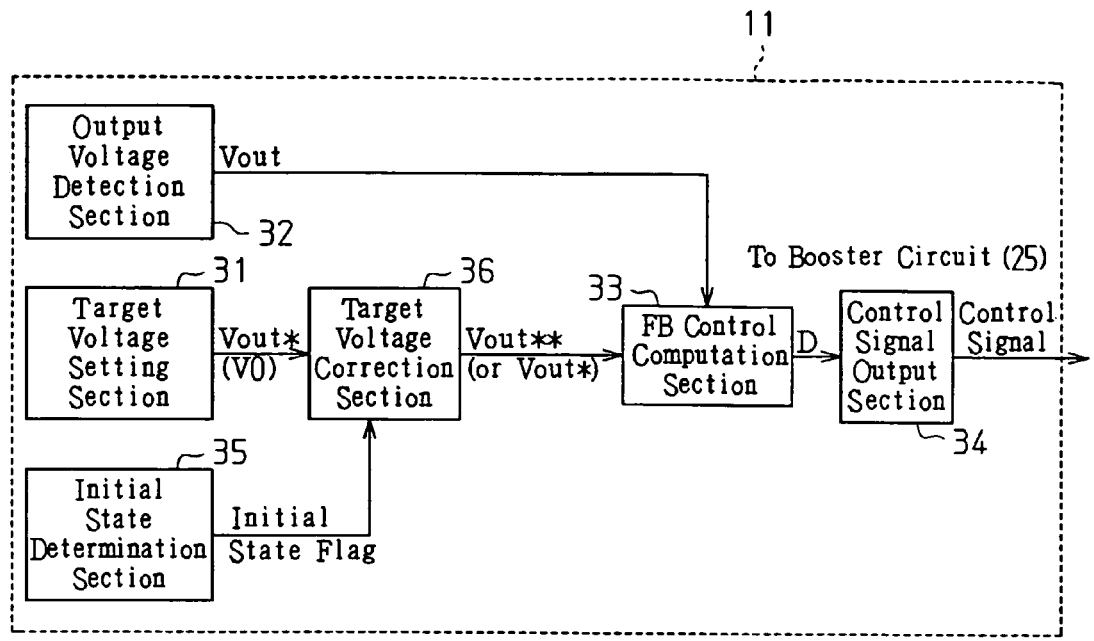
FIG. 4 is a control block diagram illustrating a microcomputer of the apparatus of FIG. 1.

FIG. 4 is a control block diagram of the microcomputer 11 of this present embodiment. Each of the control blocks described below is realized in computer programs performed by the microcomputer 11.

As shown in FIG. 4, the microcomputer 11 includes a target voltage setting section 31 for setting the target voltage Vout*, which is a control target, an output voltage detection section 32 for detecting the output voltage Vout of the booster circuit 25, and an FB control computation section 33 for performing feedback control computation based on the deviation of the output voltage Vout from the target voltage Vout*.

In this embodiment, the target voltage setting section 31 sets, as the target voltage Vout*, a predetermined voltage V0, and the output voltage detection section 32 detects the output voltage Vout of the booster circuit 25 based on the output signal of the second voltage sensor 30. The target voltage Vout* set by the target voltage setting section 31 and the output voltage Vout detected by the output voltage detection section 32 are sent to the FB control computation section 33. Based on the difference of the output voltage Vout from the target voltage Vout*, the FB control computation section 33 performs feedback control computation for controlling the output voltage Vout of the booster circuit 25.

More specifically, the FB control computation section 33 determines the duty ratio of the control signal to be sent to the booster circuit 25 through the feedback control computation, and a duty ratio instruction value D indicating the determined duty ratio to a control signal output section 34. The control signal output section 34 generates a control signal having a duty ratio indicated by the duty ratio instruction value D sent from the FB control computation section 33, and sends it to the booster circuit 25, so that the output voltage Vout of the booster circuit 25 is controlled.

The microcomputer 11 of this embodiment includes an initial state determination section 35, which functions as initial state determination means for determining whether the booster 23 is in an initial state, and a target voltage correction section 36 for correcting the target voltage Vout* based on the determination of the initial state determination section 35. If the booster 23 is in the initial state, the target voltage correction section 36 corrects the target voltage Vout* such that the corrected target voltage Vout** gradually increases from the power supply voltage Vin to the predetermined voltage V0, or to the value of the target voltage Vout* set by the target voltage setting section 31.

Specifically, the microcomputer 11 of this embodiment receives an IG on signal, which is a start signal indicating that the ignition switch has been turned on when the vehicle is started, and a reset signal, which is a restart signal indicating that malfunction diagnosis has ended, or that the vehicle is restarted (see FIG. 1). When receiving the IG on signal or the reset signal, the initial state determination section 35 determines that the booster 23 is in the initial state and sends an initial state flag indicating the determination result to the target voltage correction section 36.

On the other hand, the target voltage correction section 36 receives the target voltage Vout* set by the target voltage setting section 31. When receiving the initial state flag, the target voltage correction section 36 corrects the target voltage Vout*, and sends the corrected target voltage Vout** to the FB control computation section 33.

Figure 5:
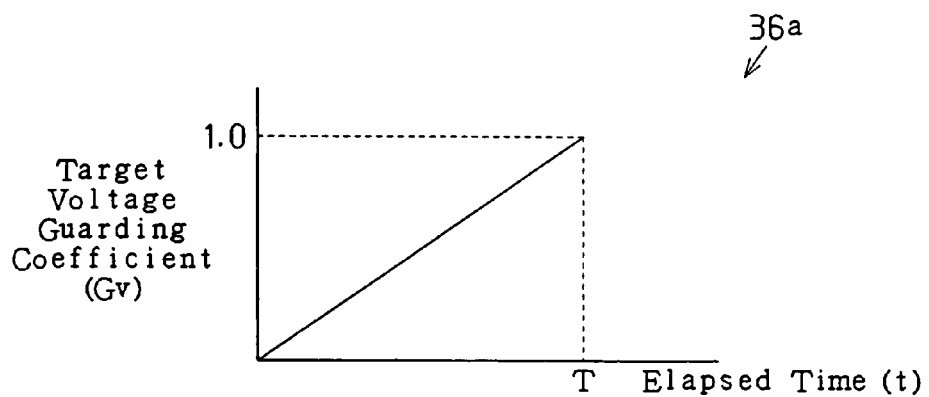
FIG. 5 is a graph showing a target voltage guarding coefficient map.

More specifically, the target voltage correction section 36 has a target voltage guarding coefficient map 36a, in which elapsed time t from when the initial state flag is received is correlated with a target voltage guarding coefficient Gv for limiting the corrected target voltage Vout** (see FIG. 5). In the target voltage guarding coefficient map 36a, the target voltage guarding coefficient Gv increases as the elapsed time t increases. Specifically, in a predetermined period T that corresponds to the period of the initial state, the target voltage guarding coefficient Gv monotonously (proportionally) increases from 0 to 1.0 as the elapsed time t increases.

The target voltage correction section 36 then determines to use the target voltage guarding coefficient Gv that corresponds to the elapsed time t by using the target voltage guarding coefficient map 36a. According to the following equation based on the target voltage guarding coefficient Gv, the target voltage correction section 36 corrects the target voltage Vout*.

$$Vout^{**}=(Vout^*-Vin)\times Gv+Vin \quad (1)$$

Figure 6:
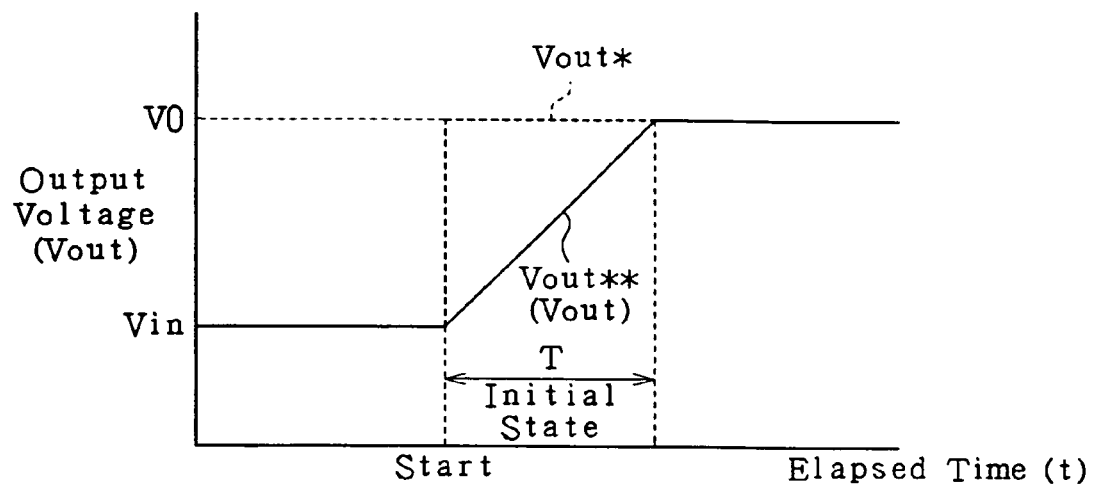
FIG. 6 is a time chart showing a process of a boost control according to the first embodiment.

That is, with respect to the target voltage Vout* sent from the target voltage setting section 31, the target voltage correction section 36 corrects the target voltage Vout* by multiplying a value (Vout*−Vin), which corresponds to an increased amount from the power supply voltage Vin, by target voltage guarding coefficient Gv, which gradually increases as the elapsed time t increases. Accordingly, during the period until the predetermined time T elapses from the start of the initial state, that is, from startup (or restart), the corrected target voltage Vout**, which gradually increases as time elapses, is sent to the FB control computation section 33 (see FIG. 6).

Procedures of initial state determination and the boost control performed by the microcomputer 11 of this embodiment will now be described.

Figure 7:
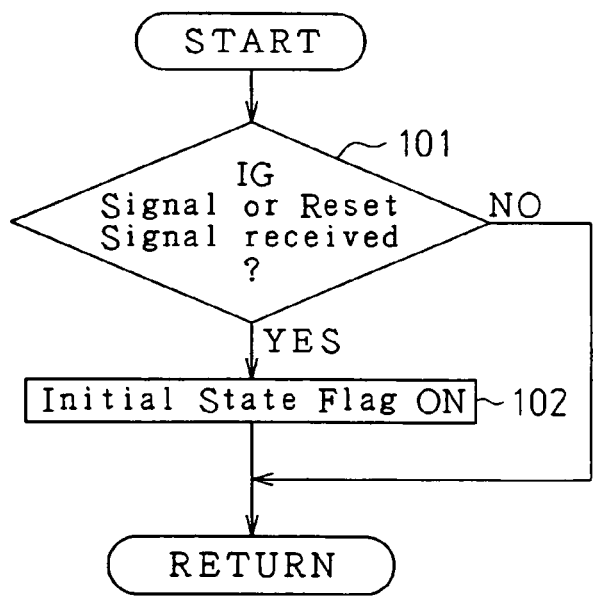
FIG. 7 is a flowchart showing a procedure for determining an initial state.

In this embodiment, the microcomputer 11 successively performs the initial state determination and the boost control in an interrupting manner at every predetermined interval. In the initial state determination process of FIG. 7, the microcomputer 11 first determines whether it has received the IG on signal or the reset signal, thereby determining whether the booster 23 is in the initial state (step 101). If the IG on signal or the reset signal has been received (step 101: YES), the microcomputer 11 determines that the booster 23 is in the initial state, and sets the initial state flag indicating the determination result to ON (step 102). If neither the IG on signal nor the reset signal has been received (step 101: NO), step 102 is not performed.

Figure 8:
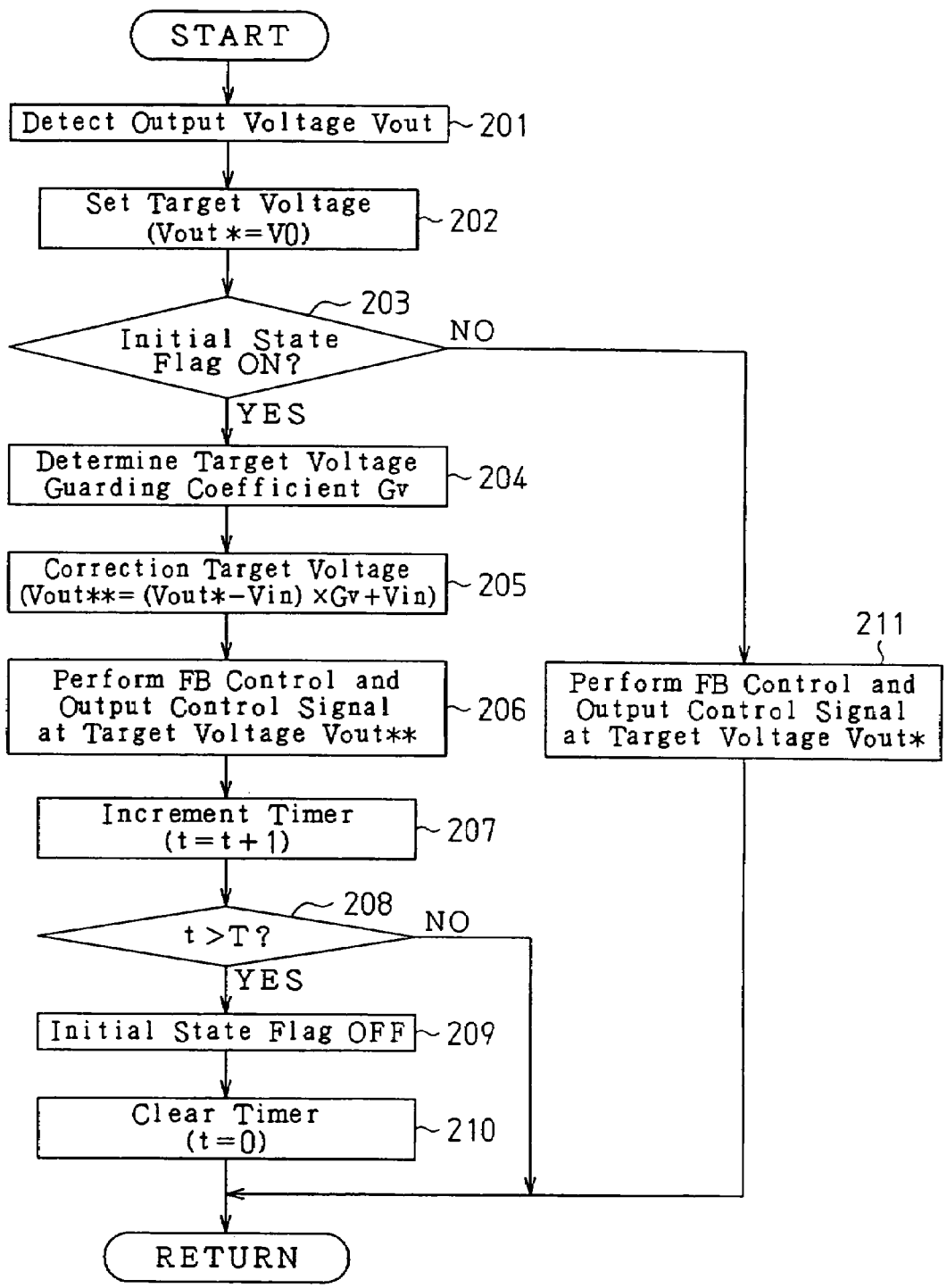
FIG. 8 is a flowchart showing a procedure for the boost control according to the first embodiment.

In the boost control process of FIG. 8, the microcomputer 11 first detects the output voltage Vout (step 201), and subsequently sets the target voltage Vout* to a predetermined voltage V0 (Vout*=V0, step 202).

Then, the microcomputer 11 determines whether the initial state flag is ON, that is, whether the booster 23 is in the initial state (step 203). If the initial state flag is ON (step 203: YES), the microcomputer 11 determines to use the target voltage guarding coefficient Gv, which corresponds to the elapsed time t from the start of the initial state, that is, from startup or restart (step 204). According to the above equation based on the target voltage guarding coefficient Gv, the microcomputer 11 performs the target voltage correction (step 205), and performs the feedback control and outputs the control signal to the booster circuit 25 by using the corrected target voltage Vout** (step 206).

Next, the microcomputer 11 increments a timer for measuring the elapsed time t by 1 (t=t+1, step 207). Subsequently, the microcomputer 11 determines whether the elapsed time t has exceeded the predetermined period T, which corresponds to the period of the initial state (step 208). When determining that the elapsed time t has exceeded the predetermined period T (t>T, step 208: YES), the microcomputer 11 sets the initial state flag to OFF (step 209) and clears the timer to zero (t=0, step 210). If the elapsed time t has not exceeded the predetermined period T (t≦T, step 208: NO), step 209 and step 210 are not performed.

That is, when the booster 23 is in the initial state (the initial state flag is ON, step 203: YES), the microcomputer 11 performs steps 201 to 208 in an interrupting manner at every predetermined interval until the elapsed time t is determined to have exceeded the predetermined period T (t>T, step 208: YES).

As the elapsed time t increases, the target voltage guarding coefficient Gv, which is determined at step 204, gradually increases. Accordingly, the corrected target voltage Vout** computed at step 205 gradually increases. When the elapsed time t has exceeded the predetermined period T (t>T, step 208: YES), and the initial state flag is turned OFF at step 209, the microcomputer 11 will determine that the initial state flag is OFF in the subsequent interruptions at the predetermined interval (step 203: NO), and will not execute steps 204 to step 210. The microcomputer performs the feedback control and outputs a control signal to the booster circuit 25 based on the target voltage Vout* set at step 202 (step 211).

The operation of the above booster 23 will now be described.

The microcomputer 11 of this embodiment includes the initial state determination section 35, which determines whether the booster 23 is in the initial state, and the target voltage correction section 36, which corrects the target voltage Vout* based on the determination of the initial state determination section 35. If the booster 23 is in the initial state, the target voltage correction section 36 corrects the target voltage Vout* such that the corrected target voltage Vout** gradually increases from the power supply voltage Vin to the predetermined voltage V0, or to the value of the target voltage Vout* set by the target voltage setting section 31.

According to this configuration, when the booster 23 is in the initial state, the corrected target voltage Vout gradually increases from the power supply voltage as time elapses during the period from the start of the initial state until the predetermined period T elapses. Since the feedback control is performed based on the corrected target voltage Vout, the deviation of the output voltage Vout from the target voltage Vout** is minimized even during the initial state. This prevents the output voltage Vout from rising abruptly, but permits the output voltage Vout to gradually increase to the target voltage Vout*. Therefore, overshooting of the output voltage Vout at the initial state is effectively prevented without increasing the manufacturing costs due to upsizing of the capacitor 28 of the booster circuit 25 and making the output voltage unstable due to lowered responsiveness.

Hereafter, an electric power steering (EPS) apparatus having a booster according to a second embodiment of the present invention will be described with reference to the drawings. To facilitate illustration, the same reference numerals are given to those components that are like or the same as the corresponding components of the first embodiment and detailed explanations are omitted.

The hardware configuration of the apparatus and the booster of this embodiment is the same as that of first embodiment, and only control blocks of a microcomputer 41 are different from those of the first embodiment.

Figure 9:
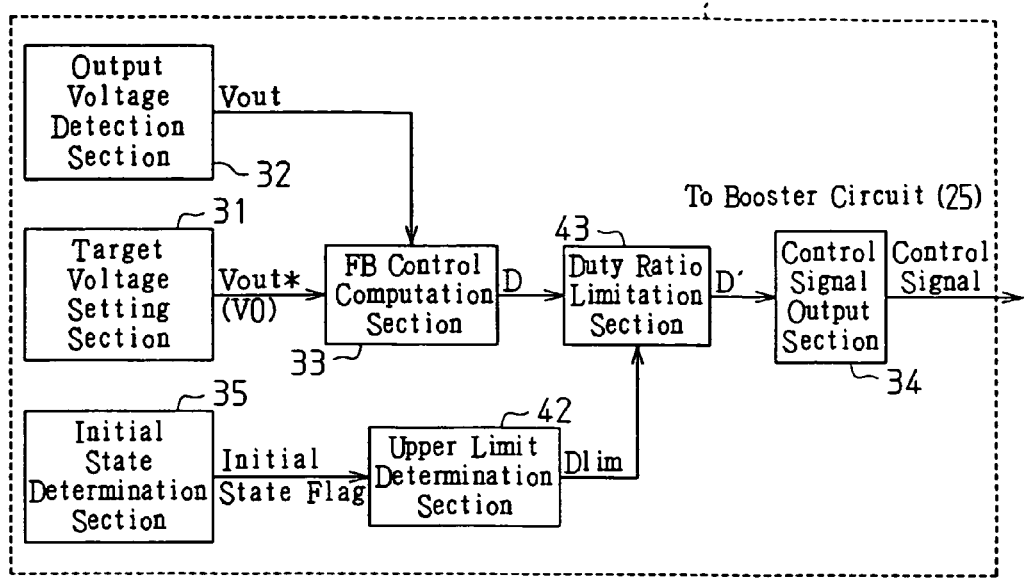
FIG. 9 is a control block diagram illustrating a microcomputer according to a second embodiment.

As shown in FIG. 9, the microcomputer 41 of this embodiment includes, instead of the target voltage correction section 36 (see FIG. 4), an upper limit determination section 42, which functions as upper limit determination means for determining an upper limit value Dlim of the duty ratio instruction value (duty ratio), and a duty ratio limitation section 43, which functions as limitation means for limiting the duty ratio instruction value sent to the control signal output section 34 to a value less than or equal to the upper limit value Dlim. At the initial state, the upper limit determination section 42 gradually increases the upper limit value Dlim as time elapses, thereby gradually increasing the duty ratio of the control signal sent to the booster circuit 25.

Specifically, the upper limit determination section 42 receives the initial state flag sent from the initial state determination section 35. When receiving the initial state flag, the upper limit determination section 42 gradually increases the upper limit value Dlim to a predetermined maximum value Dmax as the elapsed time t from the reception of the initial state flag increases.

Figure 10:
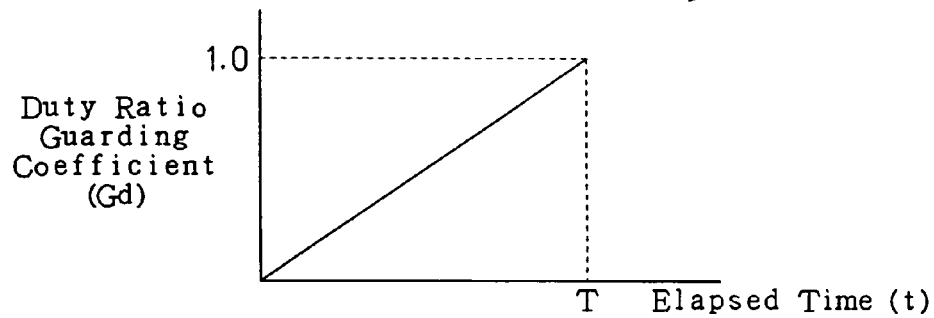
FIG. 10 is a graph showing a duty ratio guarding coefficient map.

More specifically, the upper limit determination section 42 has a duty ratio guarding coefficient map 42a, in which elapsed time t from the reception of the initial state flag is correlated with a duty ratio guarding coefficient Gd for determining the upper limit value Dlim (see FIG. 10). In the duty ratio guarding coefficient map 42a, the duty ratio guarding coefficient Gd increases as the elapsed time t increases. Specifically, in a predetermined period T that corresponds to the period of the initial state, the duty ratio guarding coefficient Gd monotonously (proportionally) increases from 0 to 1.0 as the elapsed time t increases. The upper limit determination section 42 determines to use the duty ratio guarding coefficient Gd that corresponds to the elapsed time t by using the duty ratio guarding coefficient map 42a. The upper limit determination section 42 multiplies the duty ratio guarding coefficient Gd by a maximum value Dmax of a duty ratio instruction value, thereby determining the upper limit value Dlim (Dlim=Dmax×Gd). If the initial state flag is not received, that is, if the booster 23 is not in the intial state, the upper limit value Dlim is set to the maximum value Dmax (Dlim=Dmax).

On the other hand, a duty ratio limitation section 43 receives the upper limit value Dlim and a duty ratio instruction value D outputted by the FB control computation section 33. The duty ratio limitation section 43 limits the duty ratio instruction value D to a duty ratio instruction value D' that is equal to or less than the upper limit value Dlim, and sends the duty ratio instruction value D' to the control signal output section 34.

Specifically, if the duty ratio instruction value D outputted by the FB control computation section 33 is greater than the upper limit value Dlim, the duty ratio limitation section 43 sets the upper limit value Dlim to the duty ratio instruction value D' and sends it to the control signal output section 34 (D'=Dlim). If the duty ratio instruction value D is less than or equal to the upper limit value Dlim, the duty ratio limitation section 43 sets the duty ratio instruction value D to the duty ratio instruction value D', and sends it to the control signal output section 34 (D'=D).

As the upper limit value Dlim sent from the upper limit determination section 42 increases as time elapses from the reception of the initial state flag, that is, from startup (or restart), the value of the duty ratio instruction value D' sent by the duty ratio limitation section 43 to the control signal output section 34 gradually increases, accordingly.

Figure 11:
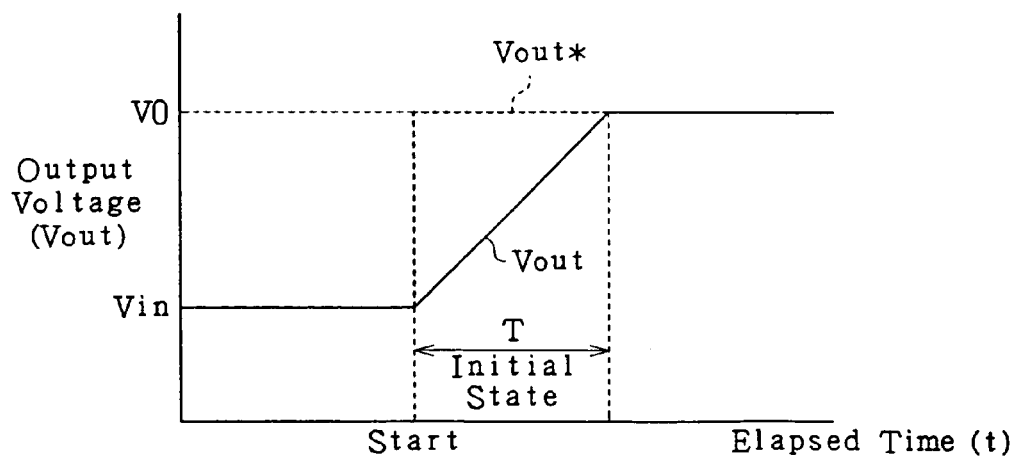
FIG. 11 is a time chart showing a process of a boost control according to the second embodiment.

That is, the duty ratio instruction value D' sent to the control signal output section 34 is constantly limited to a value equal to or less than the upper limit value Dlim, while gradually increasing as time elapses. Thus, as shown in FIG. 11, the output voltage Vout does not rise abruptly but gradually boosted to the target voltage Vout*. Therefore, as in the first embodiment, overshooting of the output voltage Vout at the initial state is effectively prevented without increasing the manufacturing costs due to upsizing of the capacitor 28 of the booster circuit 25 and making the output voltage unstable due to lowered responsiveness.

The procedure of the boost control performed by the microcomputer 41 of this embodiment will now be described.

In this embodiment, as in the case of the microcomputer 11 of the first embodiment, the microcomputer 41 successively performs the initial state determination and the boost control in an interrupting manner at every predetermined interval. Since the procedure of the initial state determination is the same as that of the first embodiment, the explanation thereof is omitted (see FIG. 7).

Figure 12:
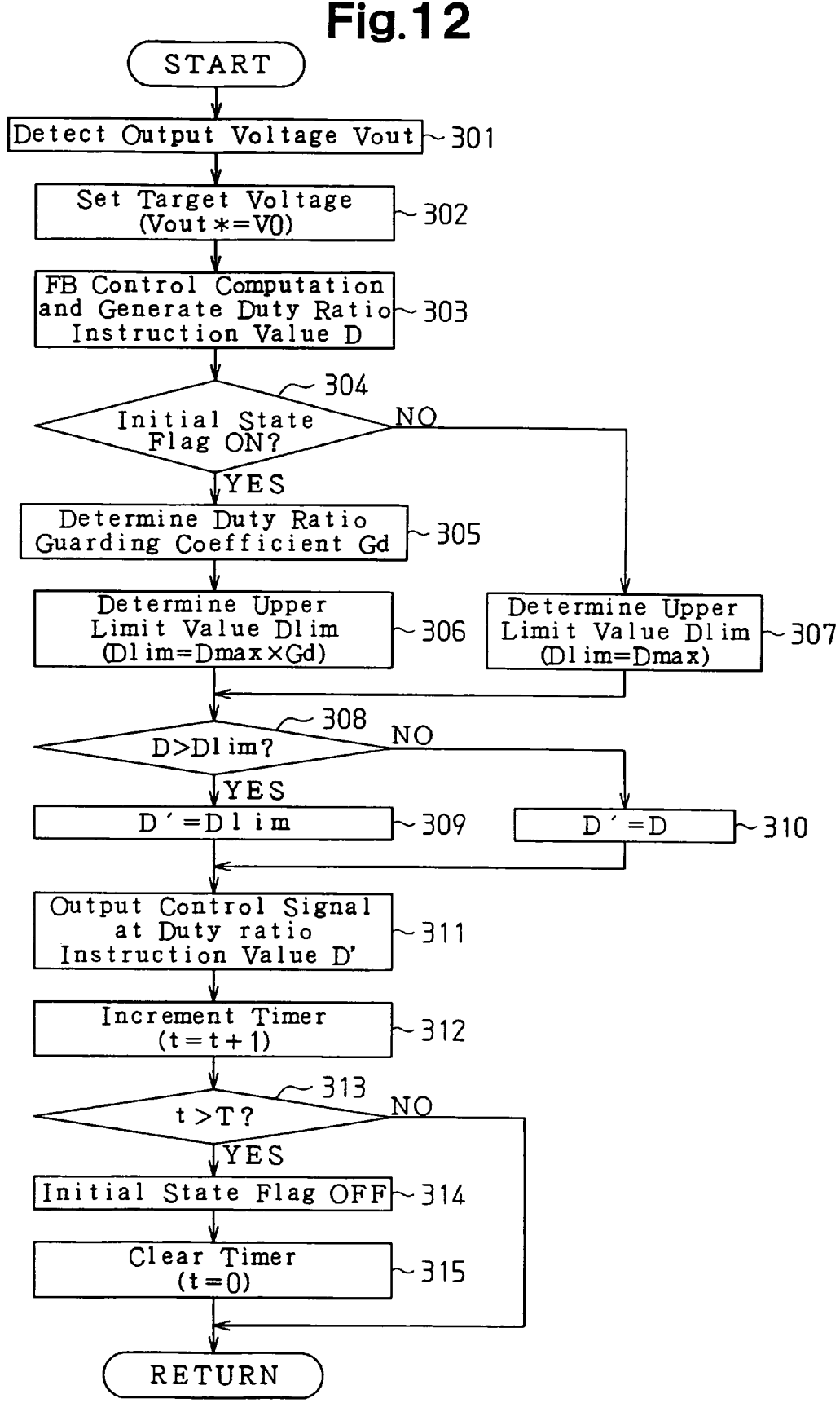
FIG. 12 is a flowchart showing a procedure for the boost control according to the second embodiment.

In the boost control process of FIG. 12, the microcomputer 41 first detects the output voltage Vout (step 301), and subsequently sets the target voltage Vout* to a predetermined voltage V0 (Vout*=V0, step 302). Then, the microcomputer 41 generates the duty ratio instruction value D through feedback control computation based on the detected output voltage Vout and the target voltage Vout* (step 303).

Next, the microcomputer 41 determines whether the initial state flag is ON, that is, whether the booster 23 is in the initial state (step 304). When determining that the initial state flag is ON (step 304: YES), the microcomputer 41 determines to use the duty ratio guarding coefficient Gd that corresponds to the elapsed time t from the starting the initial state, that is, from startup or restart (step 305). The microcomputer 41 multiplies maximum value Dmax of the duty ratio instruction value by the duty ratio guarding coefficient Gd, thereby determining the upper limit value Dlim (Dlim=Dmax×Gd, step 306). When determining that the initial state flag is OFF, that is, when the initial state has ended (step 304: NO), the microcomputer 41 sets the upper limit value Dlim to the maximum value Dmax (Dlim=Dmax, step 307).

Subsequently, the microcomputer 41 determines whether the duty ratio instruction value D generated at step 303 is greater than the upper limit value Dlim determined at step 306 or step 307 (step 308). If the duty ratio instruction value D is greater than the upper limit value Dlim (D>Dlim, step 308: YES), the microcomputer 41 sets the duty ratio instruction value D' used for generating a control signal to be sent to the booster circuit 25 to the upper limit value Dlim (D'=Dlim, step 309). When the duty ratio instruction value D is less than or equal to the upper limit value Dlim (D≦Dlim, step 308: NO), the microcomputer 41 sets the duty ratio instruction value D' to the duty ratio instruction value D generated at step 303 (step 310). Based on the duty ratio instruction value D' determined at step 309 or step 310, the microcomputer 41 generates a control signal and sends the control signal to the booster circuit 25 (step 311).

Next, the microcomputer 41 increments a timer for measuring the elapsed time t by 1 (t=t+1, step 312). Subsequently, the microcomputer 11 determines whether the elapsed time t has exceeded the predetermined period T, which corresponds to the period of the initial state (step 313). When determining that the elapsed time t has exceeded the predetermined period T (t>T, step 313: YES), the microcomputer 11 sets the initial state flag to OFF (step 314) and clears the timer to zero (t=0, step 315). If the elapsed time t has not exceeded the predetermined period T (t≦T, step 313: NO), step 314 and step 315 are not performed.

That is, when the booster 23 is in the initial state (the initial state flag is ON, step 304: YES), the microcomputer 41 performs steps 301 to 306 and steps 308 to 313 in an interrupting manner at every predetermined interval, without performing step 307, until the elapsed time t is determined to have exceeded the predetermined period T (t>T, step 313: YES).

As the elapsed time t increases, the duty ratio guarding coefficient Gd determined at step 305 increases. As a result, the upper limit value Dlim determined at step 306 gradually increases as time elapses.

Hereafter, an electric power steering (EPS) apparatus having a booster according to a third embodiment of the present invention will be described with reference to the drawings. To facilitate illustration, the same reference numerals are given to those components that are like or the same as the corresponding components of the first embodiment and detailed explanations are omitted.

The hardware configuration of the apparatus and the booster of this embodiment is the same as that of first embodiment, and only control blocks of a microcomputer 51 are different from those of the first embodiment.

Figure 13:
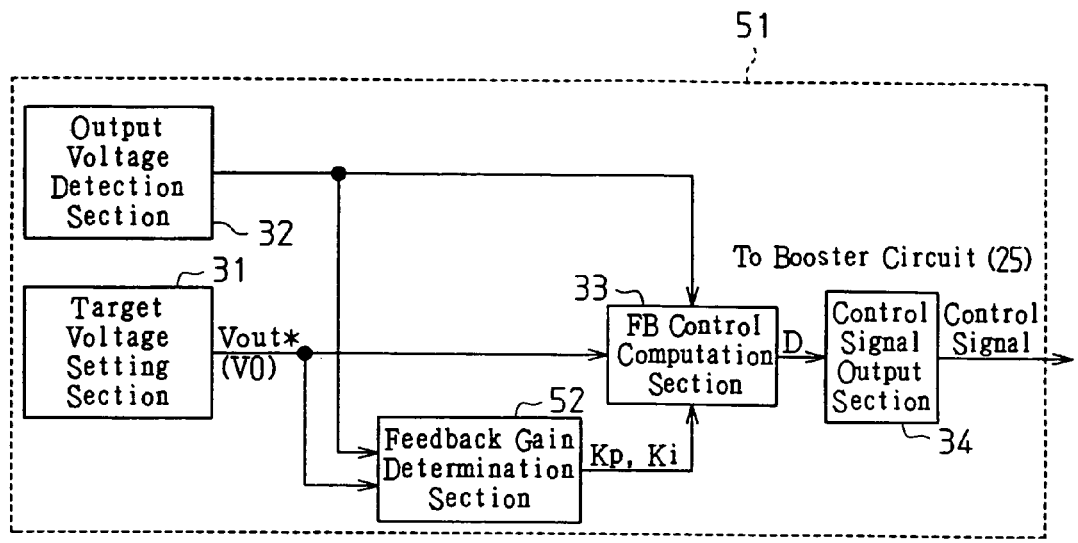
FIG. 13 is a control block diagram illustrating a microcomputer according to a third embodiment.

As shown in FIG. 13, a microcomputer 51 of this embodiment includes, instead of the initial state determination section 35 and the target voltage correction section 36 (see FIG. 4), feedback gain determination means, which is a feedback gain determination section 52 that determines feedback gain used in the FB control computation section 33. In the feedback gain determination section 52, a proportionality gain Kp and an integration gain Ki are determined. In the FB control computation section 33, proportionality control (P control) based on the proportionality gain Kp and integration control (I control) based on the integration gain Ki are performed, so that feedback control of the output voltage Vout is performed.

Specifically, in this embodiment, the feedback gain determination section 52 receives the target voltage Vout* set by the target voltage setting section 31 and the output voltage Vout detected by the output voltage detection section 32. The feedback gain determination section 52 determines to use the proportionality gain Kp and the integration gain Ki based on the deviation of the output voltage Vout from the target voltage Vout*.

More specifically, the feedback gain determination section 52 compares the deviation of the output voltage Vout from the received target voltage Vout* with a predetermined voltage difference Vc. When the deviation is less than or equal to the voltage difference Vc, the feedback gain determination section 52 generates a proportionality gain Kp0 and an integration gain Ki0 having relatively large values of high responsivity for use in the normal control. When the deviation is greater than the voltage difference Vc, the feedback gain determination section 52 generates a proportionality gain Kp1 and an integration gain Ki1 having relatively small values of lower responsivity than the proportionality gain Kp0 and the integration gain Ki0.

Figure 14:
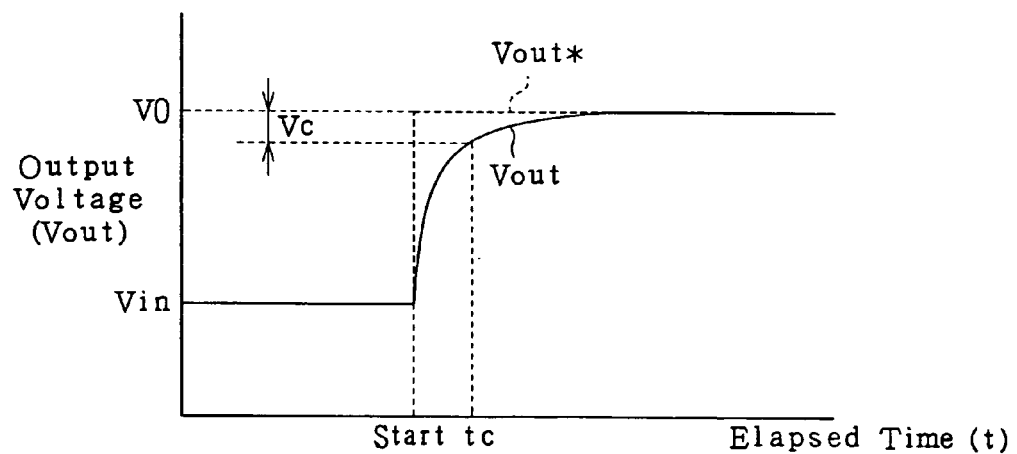
FIG. 14 is a time chart showing a process of a boost control according to the third embodiment.

That is, in the case of FIG. 14, which shows the initial state, an excessive deviation causes the output voltage Vout to rise abruptly, resulting in overshooting of the output voltage Vout immediately after startup. In this case, the feedback gain determination section 52 determines to use the proportionality gain Kp1 and the integration gain Ki1, which have relatively small values of low responsivity. Therefore, the output voltage Vout does not overshoot the target voltage Vout*, but gradually increases as time elapses.

When the deviation of the output voltage Vout from the target voltage Vout* is less than or equal to the predetermined voltage difference Vc at a switching time tc, the feedback gain determination section 52 determines to use the proportionality gain Kp0 and the integration gain Ki0, which have relatively large values of high responsivity, so that output voltage Vout is quickly boosted to the target voltage Vout*.

As a result, as in the preceding embodiments, overshooting of the output voltage Vout at the initial state is effectively prevented without increasing the manufacturing costs due to upsizing of the capacitor 28 of the booster circuit 25 and making the output voltage unstable due to lowered responsiveness.

The procedure of the boost control performed by the microcomputer 51 of this embodiment will now be described.

In this embodiment, as in the case of the microcomputer 11 of the first embodiment, the microcomputer 51 performs the boost control in an interrupting manner at every predetermined interval.

Figure 15:
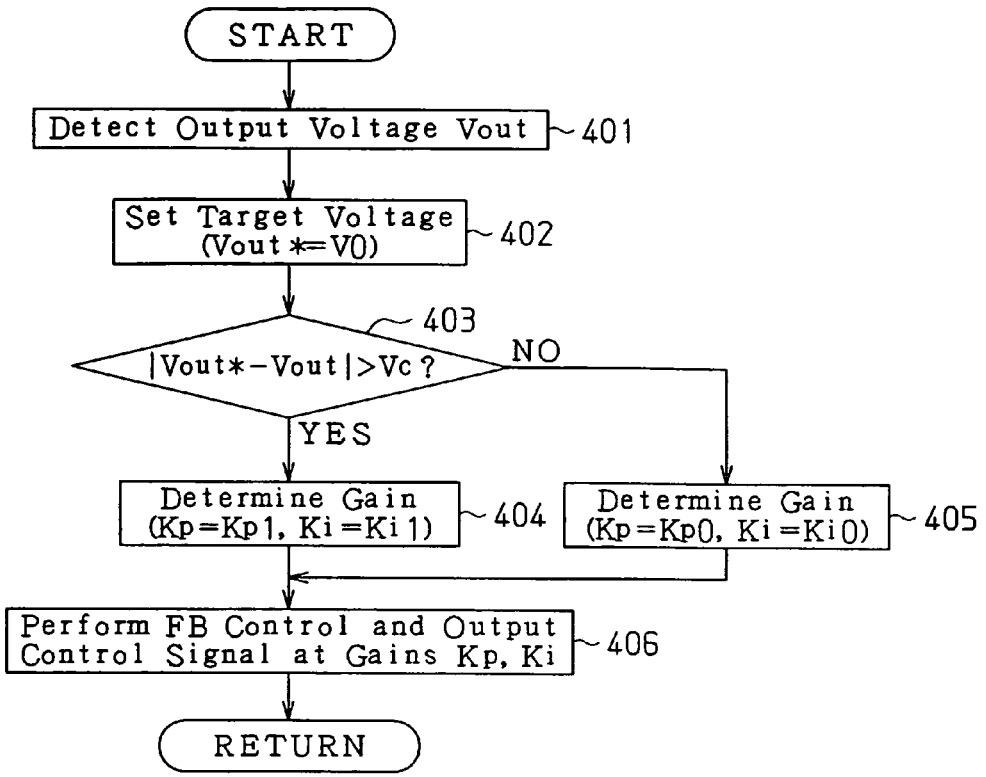
FIG. 15 is a flowchart showing a procedure for the boost control according to the third embodiment.

In the boost control process of FIG. 15, the microcomputer 51 first detects the output voltage Vout (step 401), and subsequently sets the target voltage Vout* to a predetermined voltage V0 (Vout*=V0, step 402).

Next, the microcomputer 51 determines whether the deviation of the output voltage Vout detected at step 401 from the target voltage Vout* set at step 402 (|Vout*−Vout|) is greater than the voltage difference Vc (step 403). If the deviation is greater than the voltage difference Vc (|Vout*−Vout|>Vc, step 403: YES), the microcomputer 51 determines to use the proportionality gain Kp1 and the integration gain Ki1, which have relatively small values of low responsivity, as the proportionality gain Kp and the integration gain Ki used in a feedback control, or a PI control (Kp=Kp1, Ki=Ki1, step 404).

On the other hand, if the deviation of the output voltage Vout from the target voltage Vout* (|Vout*−Vout|) is less than or equal to the predetermined voltage difference Vc at step 403 (|Vout*−Vout|≦Vc, step 403: NO), the microcomputer 51 determines to use, as the proportionality gain Kp and the integration gain Ki, the proportionality gain Kp0 and the integration gain Ki0, which have relatively large values of high responsivity (Kp=Kp0, Ki=Ki0, step 405). The microcomputer 51 then performs the feedback control based on the proportionality gain Kp and the integration gain Ki determined at step 404 or step 405, and outputs a control signal according to the feedback control (step 406).

In this manner, by performing steps 401 to 406 in an interrupting manner at every predetermined interval, the microcomputer 51 performs the feedback control of the output voltage Vout using the proportionality gain Kp1 and the integration gain Ki1, which have relatively small values of low responsivity from immediately after startup until the deviation of the output voltage Vout from the target voltage Vout* becomes less than or equal to the predetermined voltage difference Vc. Thereafter, the microcomputer 51 performs the feedback control of the output voltage Vout using the proportionality gain Kp0 and the integration gain Ki0, which have relatively large values of high responsivity.

The illustrated embodiments may be modified as follows.

In the illustrated embodiments, the target voltage setting section 31 sets the target voltage Vout* to the predetermined voltage V0. However, the value of the target voltage Vout* may be changed according to, for example, load fluctuations of the motor 2.

In the first embodiment, if the initial state determination section 35 determines that the booster 23 is in the initial state, the target voltage correction section 36 corrects the target voltage Vout* such that the corrected target voltage Vout** gradually increases from the power supply voltage Vin to the predetermined voltage V0, or to the value of the target voltage Vout* set by the target voltage setting section 31. However, the configuration may be changed as long as a target voltage, which ultimately becomes a control target of the output voltage Vout, gradually increases as time elapses. Therefore, instead of the correction performed by the target voltage correction section 36, the target voltage setting section 31 may set the target voltage Vout* to the value, through map computation based on the elapsed time t, that gradually increases from the power supply voltage Vin as time elapses. Alternatively, the target voltage correction section 36 may execute the correction using map that defines the relationship between the elapsed time t and the target voltage Vout**.

According to the first embodiment, in the predetermined period T that corresponds to the period of the initial state, the target voltage guarding coefficient Gv monotonously (proportionally) increases from 0 to 1.0 on the target voltage guarding coefficient map 36*a* as the elapsed time t increases. The target voltage correction is performed based on the equation (1) based on the target voltage guarding coefficient Gv, which is determined using the target voltage guarding coefficient map 36*a*. However, the target voltage guarding coefficient map 36*a* is not limited to the illustrated one, but may be changed as long as the target voltage guarding coefficient Gv increases as time elapses.

According to the second embodiment, in the predetermined period T that corresponds to the period of the initial state, the duty ratio guarding coefficient Gd monotonously (proportionally) increases from 0 to 1.0 on the duty ratio guarding coefficient map 42*a* as the elapsed time t increases. At the initial state, the upper limit value Dlim is determined by multiplying the duty ratio guarding coefficient Gd, which is determined by using the duty ratio guarding coefficient map 42*a*, by the maximum value Dmax of the duty ratio instruction value (Dlim=Dmax×Gd). However, the upper limit value Dlim may be determined using a map that defines the relationship between the elapsed time t and the upper limit value Dlim.

Figure 16:
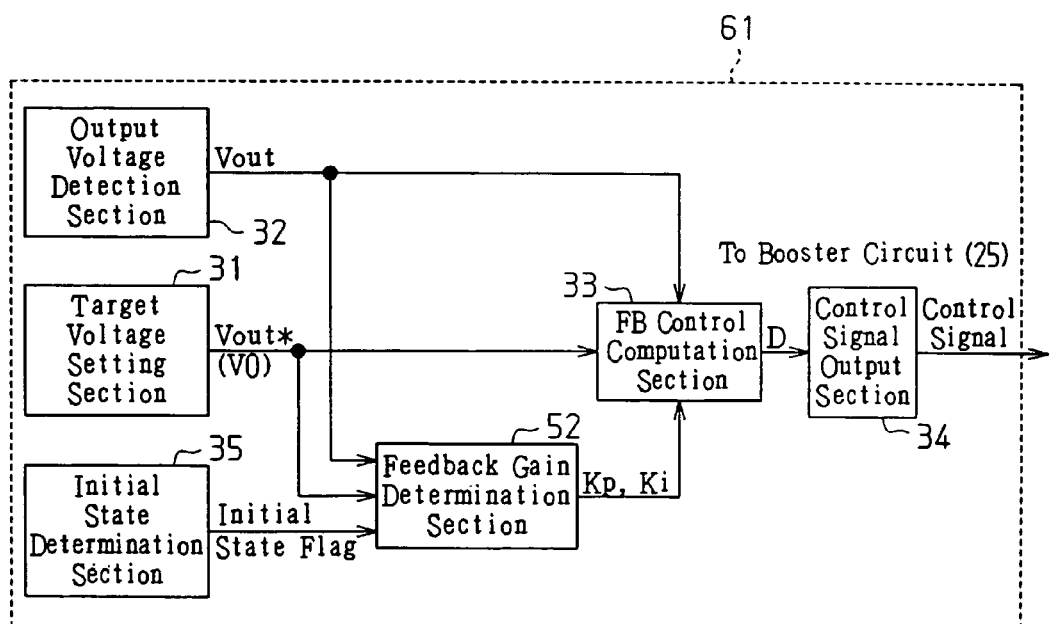
FIG. 16 is a control block diagram illustrating a microcomputer according to a modified embodiment.

The third embodiment may be modified as shown in FIG. 16. A microcomputer 61 according to the modified embodiment of FIG. 16 includes the initial state determination section 35 as in the first and second embodiments. The microcomputer 61 changes the feedback gain only at the initial state.

In the third embodiment, switching between the proportionality gain Kp1 and the integration gain Ki1 having relatively small values of low responsivity and the proportionality gain Kp0 and the integration gain Ki0 having relatively large values of high responsivity is performed based on the deviation of the output voltage Vout from the target voltage Vout*. However, a predetermined period T1 that corresponds to the period from the startup (or restart) to the switching time tc (see FIG. 14) may be set in advance, and the switching may be performed based on the elapsed time from the start of the initial state, or from startup (or restart). The predetermined period T1 is preferably shorter than the predetermined period T in the first and second embodiments.

Figure 17:
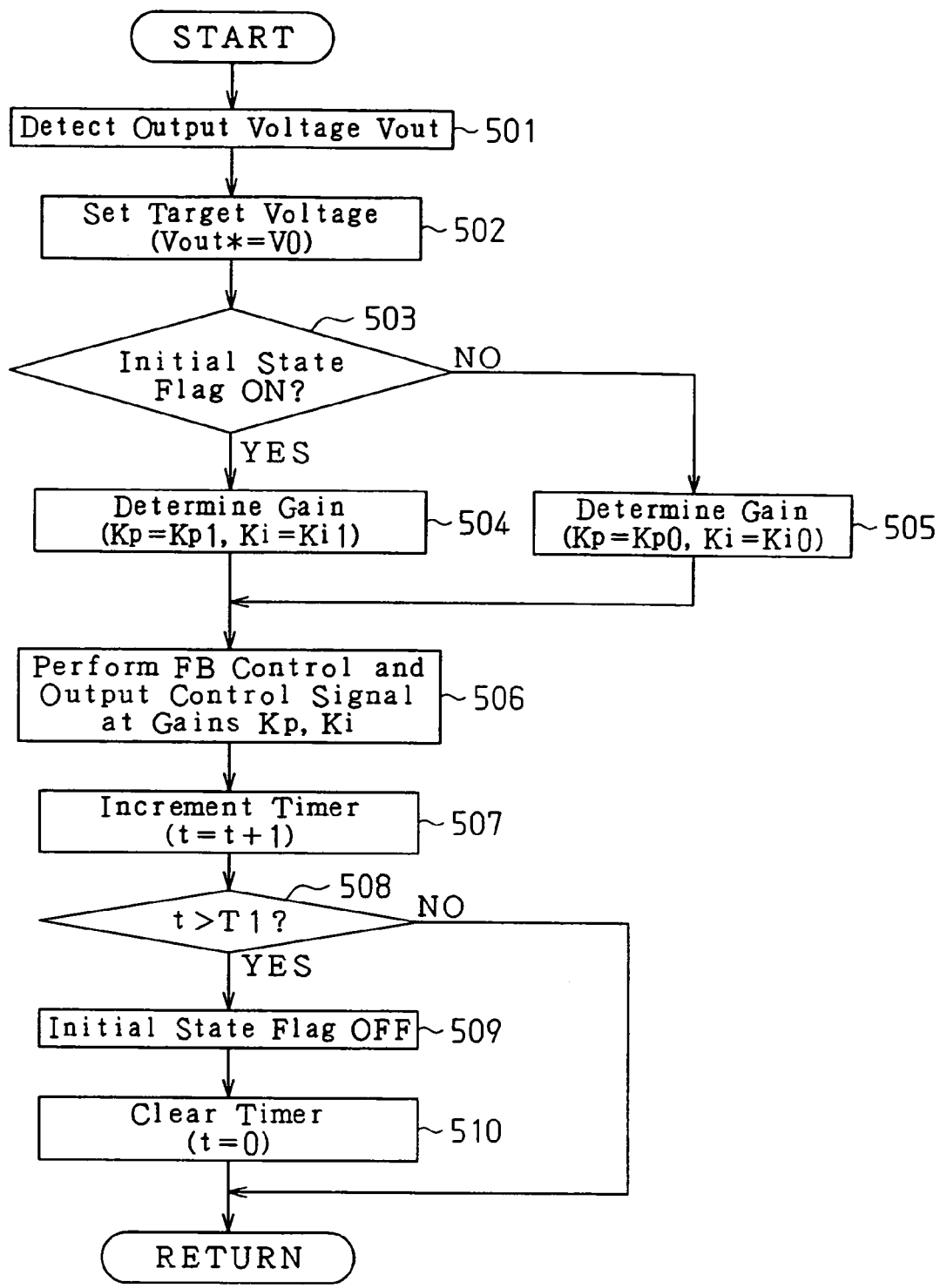
FIG. 17 is a flowchart showing a procedure of boost control according to another modified embodiment.

This modified embodiment can be performed according to the procedure of the flowchart shown in FIG. 17. In this embodiment, as in the first embodiment, the initial state determination and the boost control are successively performed in an interrupting manner at every predetermined interval.

In the boost control process of FIG. 17, the microcomputer 51 first detects the output voltage Vout (step 501), and subsequently sets the target voltage Vout* to a predetermined voltage V0 (Vout*=V0, step 502). Then, the microcomputer 51 determines whether the initial state flag is ON, that is, whether the booster 23 is in the initial state (step 503). If the initial state flag is ON (step 503: YES), the microcomputer 51 determines to use the proportionality gain Kp1 and the integration gain Ki1, which have relatively small values of low responsivity, as the proportionality gain Kp and the integration gain Ki used in the feedback control (Kp=Kp1, Ki=Ki1, step 504). Contrastingly, if the initial state flag is OFF (step 503: NO), the microcomputer 51 determines to use the proportionality gain Kp0 and the integration gain Ki0, which have relatively large values of high responsivity, as the proportionality gain Kp and the integration gain Ki used in the feedback control (Kp=Kp0, Ki=Ki0, step 505). The microcomputer 51 then performs the feedback control based on the proportionality gain Kp and the integration gain Ki determined at step 504 or step 505, and outputs a control signal according to the feedback control (step 506).

Next, the microcomputer 51 increments a timer for measuring the elapsed time t by 1 (t=t+1, step 507). Subsequently, the microcomputer 51 determines whether the elapsed time t from the start of the initial state, or from startup (or restart) has exceeded a predetermined period T1, which corresponds to the period from the startup (or restart) to the switching time tc (step 508). When determining that the elapsed time t has exceeded the predetermined period T1 (t>T1, step 508: YES), the microcomputer 51 sets the initial state flag to OFF (step 509) and clears the timer to zero (t=0, step 510). If the elapsed time t has not exceeded the predetermined period T1 (t≦T1, step 508: NO), step 509 and step 510 are not performed.

That is, when the booster 23 is in the initial state (the initial state flag is ON, step 503: YES), the microcomputer 51 performs steps 501 to 504 and steps 506 to 508 in an interrupting manner at every predetermined interval until the elapsed time t is determined to have exceeded the predetermined period T1 (t>T, step 508: YES). The microcomputer 51 performs the feedback control based on the proportionality gain Kp1 and the integration gain Ki1 (Kp=Kp1, Ki=Ki1), which have relatively small values of low responsivity, determined at step 504, and outputs a control signal according to the feedback control.

When the elapsed time t has exceeded the predetermined period T1 (t>T1, step 508: YES), and the initial state flag is turned OFF at step 509, the microcomputer 51 will determine that the initial state flag is OFF in the subsequent interruptions at the predetermined interval (step 503: NO). Then, the microcomputer 51 performs the feedback control based on the proportionality gain Kp0 and the integration gain Ki0 (Kp=Kp0, Ki=Ki0), which have relatively large values of high responsivity, determined at step 505, and outputs the control signal according to the feedback control. This modification has the same advantages as the above embodiments.

In the third embodiment and the modified embodiment of FIG. 17, the proportionality gain Kp0 and the integration gain Ki0, which have relatively large values of high responsivity, and the proportionality gain Kp1 and the integration gain Ki1, which have relatively small values of lower responsivity than that of the proportionality gain Kp0 and the integration gain Ki0, are switched based on the deviation of the output voltage Vout from the target voltage Vout* (or elapsed time from the start of the initial state). Instead, the proportionality gain and the integration gain may be switched among three or more stages.

Figure 18A:
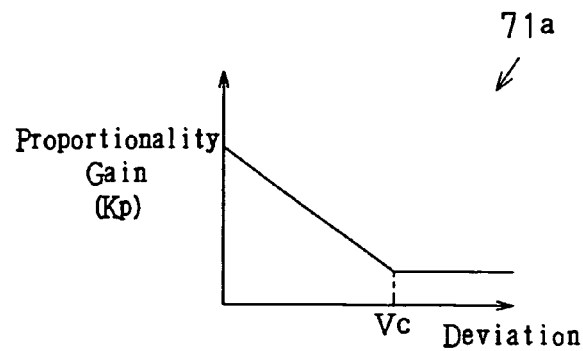
FIG. 18(a) is a graph showing a proportionality gain map.
Figure 18B:
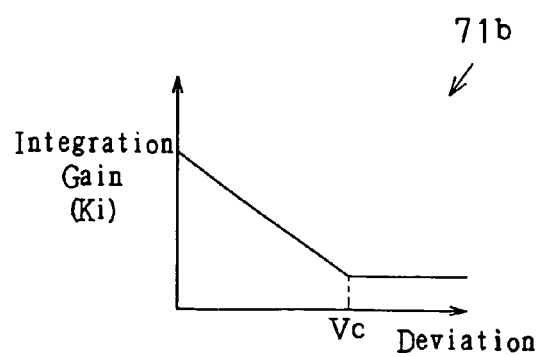
FIG. 18(b) is a graph showing an integration gain map.
Figure 19A:
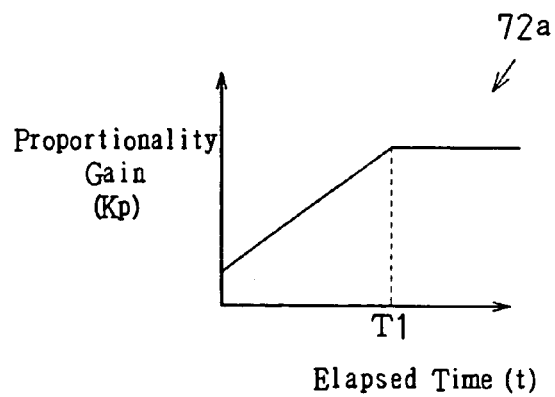
FIG. 19(a) is a graph showing a proportionality gain map.
Figure 19B:
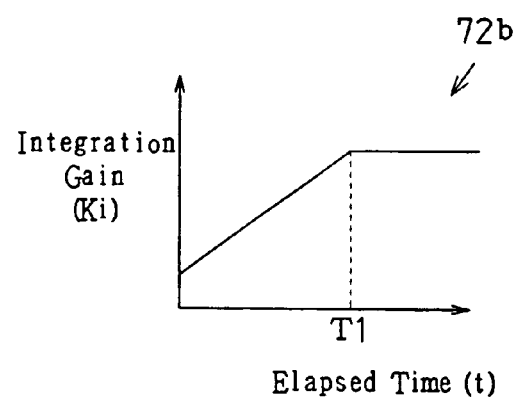
FIG. 19(b) is a graph showing an integration gain map.

A proportionality gain map 71*a* shown in FIG. 18(*a*) and an integration gain map 71*b* shown in FIG. 18(*b*), in which the proportionality gain Kp and the integration gain Ki are related to the deviation of the output voltage Vout from the target voltage Vout* may be used. In this case, the proportionality gain Kp and the integration gain Ki increase as the deviation of the output voltage Vout from the target voltage Vout* decreases. Alternatively, a proportionality gain map 72*a* shown in FIG. 19(*a*) and an integration gain map 72*b* shown in FIG. 19(*b*), in which the proportionality gain Kp and the integration gain Ki are related to the elapsed time t from the start of the initial state may be used. In this case, the proportionality gain Kp and the integration gain Ki increase as the elapsed time t increases within a predetermined period T that corresponds to the predetermined initial state.

Further, the proportionality gain Kp0 and the integration gain Ki0, which are used when the deviation of the output voltage Vout from the target voltage Vout* is greater than the predetermined voltage difference Vc (or when the elapsed time from the start of the initial state is within a predetermined period) may be any values as long as the proportionality gain Kp0 and the integration gain Ki0 have small values of lower responsivity than that of the proportionality gain Kp1 and the integration gain Ki1 in the normal control. For example, the integration gain Ki0 may be zero, so that the output voltage Vout rises only through proportionality control, and integrity control may be started thereafter.

In the illustrated embodiments, the present invention is applied to an EPS apparatus having a booster. However, the present invention may be applied to booster used in devices other than EPS apparatuses.

The invention claimed is:

1. A booster in an electric power steering system having a manual steering input member mechanically connected to apply a manual steering input to at least one road wheel and a motor as a driving source connected for applying assisting force to the power steering system to assist the manual steering input, comprising:
    a booster circuit outputting an output voltage to the motor of the electric power steering system, the output voltage being obtained by boosting a power supply voltage; and
    a control section controlling the output voltage of the booster circuit through a feedback control based on a deviation of the output voltage from a target voltage,
    wherein the control section includes a feedback gain determination section that determines a feedback gain of the feedback control based on the deviation, and
    wherein the feedback gain determination section determines the feedback gain such that the feedback gain has a value of a low responsivity in an initial state of the booster circuit based on a start signal or a restart signal, the responsivity increasing from the low responsivity as the deviation of the output voltage from the target voltage decreases.

2. A booster in an electric power steering system having a manual steering input member mechanically connected to apply a manual steering input to at least one road wheel and a motor as a driving source connected for applying assisting force to the power steering system to assist the manual steering input, comprising:
    a booster circuit outputting an output voltage to the motor of the electric power steering system, the output voltage being obtained by boosting a power supply voltage; and
    a control section controlling the output voltage of the booster circuit through a feedback control based on a deviation of the output voltage from a target voltage,
    wherein the control section includes a feedback gain determination section that determines a feedback gain of the feedback control based on the deviation, and
    wherein, when the deviation of the output voltage from the target voltage is greater than a predetermined value in an initial state of the booster circuit based on a start signal or a restart signal, the feedback gain determination section determines the feedback gain such that the feedback gain has a value of a lower responsivity than the responsivity of the feedback gain in the case where the deviation of the output voltage from the target voltage is equal to or less than the predetermined value.

3. The booster according to claim 2, wherein the control section performs, as the feedback control, a proportionality control and an integration control, and wherein, when the deviation of the output voltage from the target voltage is greater than the predetermined value, the feedback gain determination section sets an integration gain of the integration control to zero.

4. A booster in an electric power steering system having a manual steering input member mechanically connected to apply a manual steering input to at least one road wheel and a motor as a driving source connected for applying assisting force to the power steering system to assist the manual steering input, comprising:
    a booster circuit outputting an output voltage to the motor of the electric power steering system, the output voltage being obtained by boosting a power supply voltage; and
    a control section controlling the output voltage of the booster circuit through a feedback control based on a deviation of the output voltage from a target voltage,
    wherein the control section includes:
    an initial state determination section that determines whether the booster is in an initial state based on a start signal or a restart signal; and
    a feedback gain determination section that determines a feedback gain of the feedback control,
    wherein, when the initial state determination section determines that the booster is in the initial state, the feedback gain determination section determines the feedback gain such that the feedback gain has a value of low responsivity, the responsivity increasing as the elapsed time from the start of the initial state increases until a predetermined period elapses from the start of the initial state.

5. A booster in an electric power steering system having a manual steering input member mechanically connected to apply a manual steering input to at least one road wheel and a motor as a driving source connected for applying assisting force to the power steering system to assist the manual steering input, comprising:
    a booster circuit outputting an output voltage to the motor of the electric power steering system, the output voltage being obtained by boosting a power supply voltage; and
    a control section controlling the output voltage of the booster circuit through a feedback control based on a deviation of the output voltage from a target voltage,
    wherein the control section includes:
    an initial state determination section that determines whether the booster is in an initial state based on a start signal or a restart signal; and
    a feedback gain determination section that determines a feedback gain of the feedback control,
    wherein, when the initial state determination section determines that the booster is in the initial state, the feedback gain determination section determines, before a predetermined period elapses from the start of initial state, the feedback gain such that the feedback gain has a value of a lower responsivity than the responsivity of the feedback gain after the predetermined period has elapsed from the start of the initial state.

6. The booster according to claim 5, wherein the control section performs, as the feedback control, a proportionality control and an integration control, and wherein, when an elapsed time has not elapsed from the start of the initial state, the feedback gain determination section sets an integration gain of the integration control to zero.

* * * * *